J. C. GIBSON.
Weather-Strip.
No. 221,454. Patented Nov. 11, 1879.
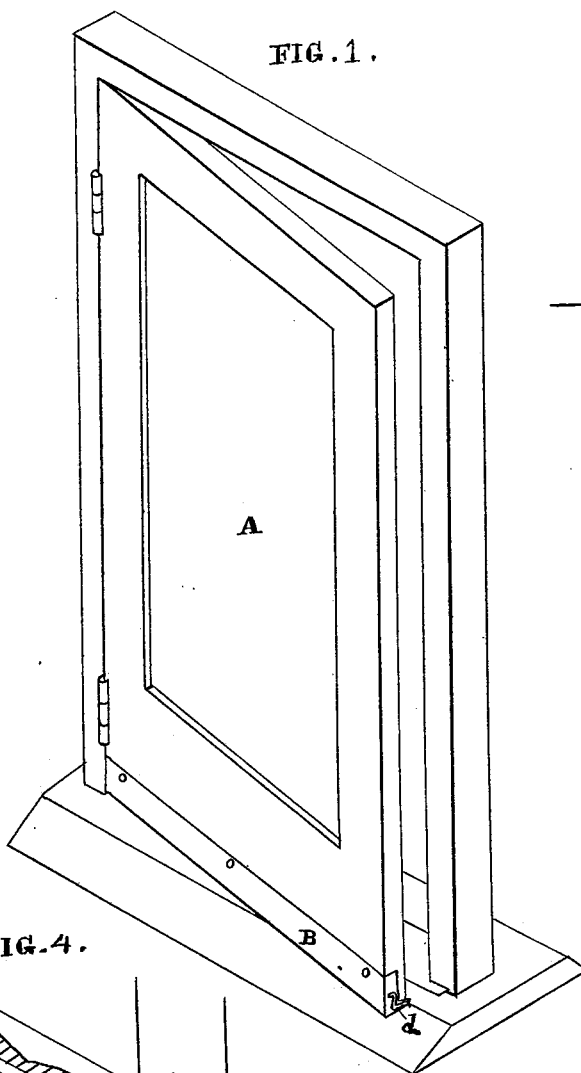
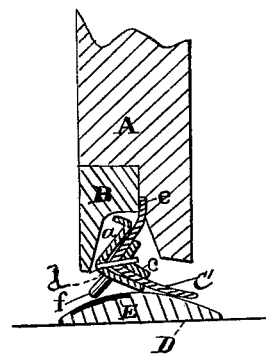
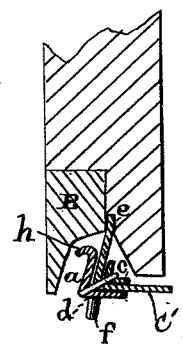
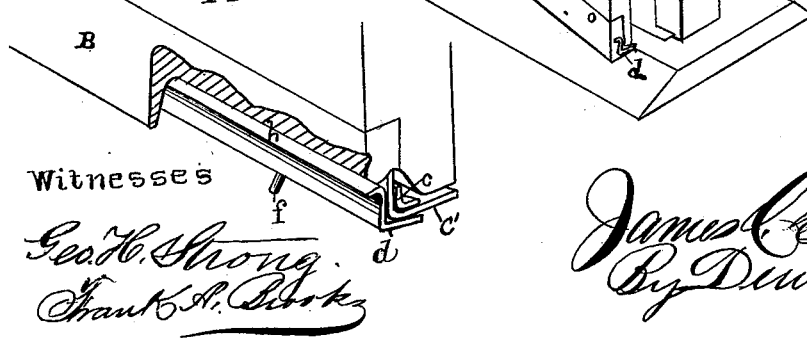

UNITED STATES PATENT OFFICE.

JAMES C. GIBSON, OF SAN FRANCISCO, CALIFORNIA.

IMPROVEMENT IN WEATHER-STRIPS.

Specification forming part of Letters Patent No. 221,454, dated November 11, 1879; application filed April 21, 1879.

*To all whom it may concern:*

Be it known that I, JAMES C. GIBSON, of the city and county of San Francisco and State of California, have invented a Weather-Strip; and I hereby declare the following to be a full, clear, and exact description thereof, reference being made to the accompanying drawings.

My invention relates to an improved weather-strip for doors; and my improvements consist in the employment of a peculiar elastic strip, secured to a movable plate in a recess at the bottom of the door, and all arranged, as hereinafter set forth, so that when the door is closed the strip is forced down tightly against the sill, so as to prevent the entrance of wind and rain and make a close joint. On the opening of the door the strip is thrown back into the recess or against the bottom of the door by its own elasticity.

The peculiar construction of the weather-strip is such that no supplemental hinges are necessary, the substance of which it is composed being elastic, and while it forms a tight joint when the door is closed it is thrown up out of the way as it is open.

Figure 1 is a view of the door with the weather-strip attached. Figs. 2, 3, and 4 are details of construction.

The door A has a recess, a, cut at its lower inner edge, as shown, and a batten or finishing-piece, B, is placed over it, so that the weather-strip is concealed.

A concave metallic plate, d, runs lengthwise the recess, and in its inner face is secured a piece of rubber forming the weather-strip. A smaller concave plate, c, is placed on the opposite side of the rubber, and pins or bolts bind the two plates together and hold the rubber between them. The upper end or hinge e of the rubber is secured between the door and the batten or finishing-piece and holds the plates in position. On the lower concave plate, d, is secured a lug, f, for the purpose of operating the weather-strip, as hereinafter described.

When the door is opened the lug remains in a vertical position and the weather strip or rubber c' lies up against the edge or bottom of the door, as shown in Fig. 4. On the door-sill D is placed a friction-plate, E, and when the door is closed the lug comes in contact with this plate as soon as it comes over it. When the door is swung into its frame the lug is thrown toward a horizontal position by its contact with the plate E. This action throws the plate d back, it swinging on the elastic hinge e formed by the rubber, and the strip c', being held to this plate by the smaller plate or rod c, is down flat on the sill, as shown in Fig. 2.

A small shoulder, h, is formed in the curve-plate b, so that as the lug turns the said plate it is drawn down, and the rubber hinge e is stretched by a curved edge to prevent wear. By this means when the door is opened the plate is drawn back to its normal position by the stretch of the rubber, and the weather-strip is lifted clear of the sill, so as not to be in the way in opening or closing the door.

In this way the weather-strip is drawn up against the bottom of the door when the door is opened, and is forced out and down against the sill or threshold when the door is closed.

Being held down against the sill in the manner described, when the door is closed a perfectly-tight joint is formed under the door, through which no rain or wind can drive. Even should the door step or sill be uneven from wear or other cause, the weather-strip, being rubber, will accommodate itself to any irregularities of surface readily. The lug holds the plate and strip down close, but as soon as the door is opened the spring of the rubber throws the strip back into the recess or against the bottom of the door, and the lug down, so as to be ready to operate again on the closing of the door.

The plate on the door-sill may be put in in any way, the simplest being to bore a hole and set it in flush, so the lug will come in contact with it, but it will not be in the way. The rubber strip is secured to the finishing piece or batten first, and when the batten is put in place the whole device is firmly attached to the door.

By using this weather-strip I can dispense entirely with a sill to the door by the use of a stub or pin, which will take the place of the sill-plate, as the weather-strip will then close the space under the door when closed.

Having thus described my invention, what I claim as new, and desire to secure by Letters Patent, is—

1. The elastic strip $c'$ swung in a recess at the bottom of a door at $e$, and secured between the plates $d$ $c$, said plate $d$ being provided with a lug, $f$, which impinges on the sill-plate E, all combined substantially as shown, whereby the weather-strip is closed down on the sill when the door is closed and a tight joint made, as and for the purpose herein described.

2. In combination, the plate $d$ holding the rubber strip $c'$, and provided with the shoulder $h$ and the lug $f$, by means of which the plate is tilted and the strip closed down on the sill, the rubber hinge $e$ forming part of said strip and stretched, so as to throw said strip back into the recess out of the way on opening the door, and throw the lug down ready for operation, substantially as herein described.

3. The elastic strip $c'$ forming the weather-strip and hinge in one piece, in combination with the concave-shouldered plate $d$ and lug $f$, by means of which the plate is tilted and the strip operated, substantially as and for the purpose herein described.

In witness whereof I have hereunto set my hand.

JAMES C. GIBSON.

Witnesses:
 CHAS. G. YALE,
 FRANK A. BROOKS.